(12) United States Patent
Clemens

(10) Patent No.: US 7,860,539 B2
(45) Date of Patent: Dec. 28, 2010

(54) KEYPAD FOR A SLIDER TYPE PORTABLE MOBILE COMMUNICATIONS DEVICE

(75) Inventor: Mark Marion Clemens, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 575 days.

(21) Appl. No.: 11/747,262

(22) Filed: May 11, 2007

(65) Prior Publication Data
US 2008/0280658 A1  Nov. 13, 2008

(51) Int. Cl.
*H04B 1/38* (2006.01)
(52) U.S. Cl. ............ 455/575.4; 455/575.1; 455/90.3
(58) Field of Classification Search ............ 455/575.4, 455/575.1, 90.3, 95
See application file for complete search history.

(56) References Cited

U.S. PATENT DOCUMENTS

| 6,996,426 B2 * | 2/2006 | Granberg | 455/575.4 |
| 2006/0045259 A1 * | 3/2006 | Vizier | 379/433.04 |
| 2006/0111161 A1 * | 5/2006 | Cha et al. | 455/575.4 |
| 2008/0150767 A1 * | 6/2008 | Lawton et al. | 341/22 |

FOREIGN PATENT DOCUMENTS

| EP | 1722538 A | 11/2006 |
| WO | 03034697 A | 4/2003 |

OTHER PUBLICATIONS

International Search Report and Written Opinion from corresponding PCT Application No. PCT/US2007/086972.

* cited by examiner

*Primary Examiner*—John Lee
(74) *Attorney, Agent, or Firm*—Harrity & Harrity, LLP

(57) ABSTRACT

Disclosed is a slider type portable mobile communications device includes a top panel and a bottom panel. The bottom panel further includes one or more tapered keys that are tapered from front to back and associated recessed areas. The top and bottom panel are slidably movable in at least one direction with respect to one another such that they can define a closed position and an open position. When the top panel is moved from the open position to the closed position, it will exert a downward force on the tapered keys as it encounters them. The downward force is sufficient to compress and hold the tapered keys in their respective recessed areas within the bottom panel in the closed position thereby maintaining a consistent depth form factor for the slider type portable mobile communications device.

3 Claims, 3 Drawing Sheets

KEYPAD FOR A SLIDER TYPE PORTABLE MOBILE COMMUNICATIONS DEVICE

DETAILED DESCRIPTION OF EMBODIMENTS OF THE INVENTION

Figure 1:
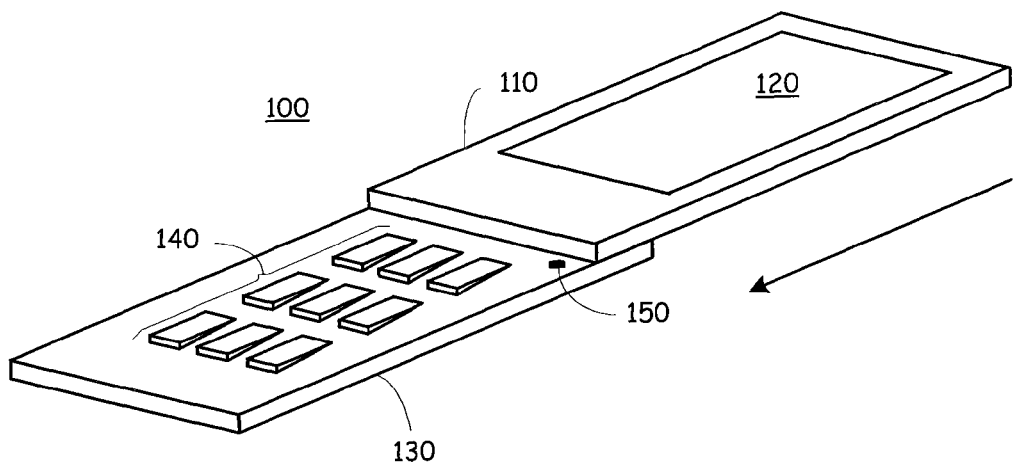
FIG. 1 is a perspective view of a slider type portable mobile communications device in an open position.

FIG. 1 is a perspective view of a slider type portable mobile communications device 100 in an open position. A slider type portable mobile communications device 100 includes a top panel 110 and a bottom panel 130 that substantially cover each other in a closed position. The two panels 110, 130 are attached to one another in a manner that allows for the top panel 110 to slide, in at least one direction, with respect to the bottom panel 130 such that another surface of the bottom panel 130 becomes exposed and the surface area of the entire slider type portable mobile communications device 100 is increased. The newly exposed surface of the bottom panel 130 is typically used to house a numeric keypad 140 that may include other non-numeric keys as well. Thus, in the open position, the user has access to the keypad 140.

Figure 3:
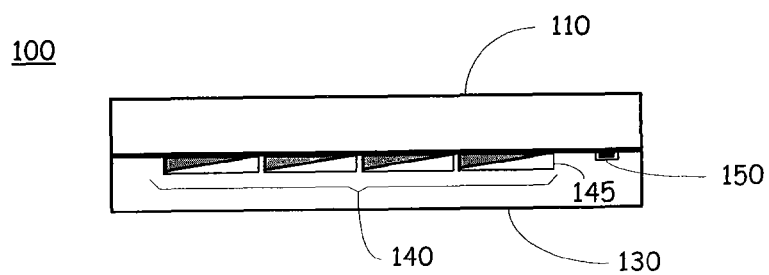
FIG. 3 is a side view of a slider type portable mobile communications device in a closed position.

The top panel 110 is the typical location reserved for a display screen 120 for the slider type portable mobile communications device 100. Often, there is additional space on the top panel below the screen display 120 for a few buttons or keys (not shown) that provide a user interface function to access and use various features associated with the slider type portable mobile communications device 100. For instance the user can answer calls while the slider type portable mobile communications device 100 is in its closed position (as shown in FIG. 3) since keypad 140 access is not necessarily required for this function.

Also shown in FIG. 1 is a small raised mechanical switch 150 serves as a sensor to determine if the slider type portable mobile communications device 100 is in the open or closed position. For reasons that will be described and become apparent later, some embodiments of the present invention need to know whether the keypad is exposed or hidden so that the electrical contacts that carry the individual keypad signals can be made active or inactive. For purposes of illustration, a physical mechanical switch has been shown as one implementation of a sensor for determining whether the slider type portable mobile communications device 100 is in the open or closed position. Other sensor mechanisms known to those of ordinary skill in the art may also be implemented such as for instance, but not limited to, a light sensor that is darkened when the slider type portable mobile communications device 100 is in the closed position. Even if the slider type portable mobile communications device 100 were being operated in a dark room or at night, the light sensor could be made to sense the ambient light from the screen display.

The idea of a slider type portable mobile communications device 100 is to maximize screen display 120 size by "hiding" the keypad 140. The keypad 140 is only exposed when necessary or desired by the user.

The relative dimensions shown in FIG. 1 are not necessarily to scale with respect to the distance the top panel 110 and bottom panel 130 may be separated from one another. In addition, the mechanism that attaches the top 110 and bottom 130 panels and also allows for the slidable motion is not depicted herein but may include any of those well known to those of ordinary skill in the art.

Figure 2:
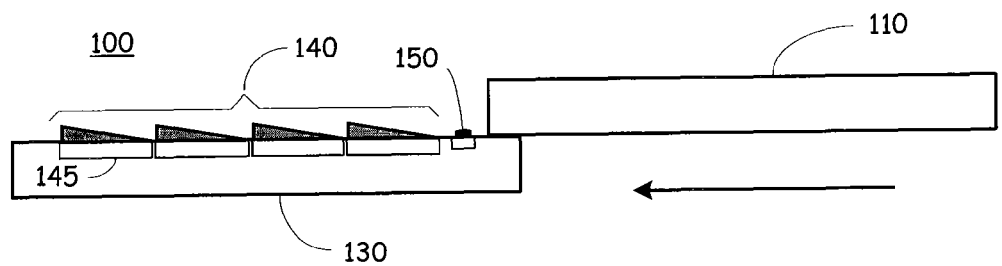
FIG. 2 is a side view of a slider type portable mobile communications device in an open position.

FIG. 2 is a side view of a slider type portable mobile communications device 100 in an open position. In this illustration the top panel 110 of slider type portable mobile communications device 100 is more or less fully extended or separated from the bottom panel 130. The mechanical switch 150 sensor is in the up position indicating that the keypad is exposed. Similarly, if a light sensor mechanism where used it would detect the change in light from the closed position. Since the sensor mechanism has determined the slider type portable mobile communications device 100 is in the open position, the keypad 140 is activated meaning that signals generated as a result of depressing one or more individual keys will be processed accordingly.

The individual keys that make up the keypad 140 appear to be wedge-shaped or tapered from back to front. Also shown in this cross-sectional view of the bottom panel 130 is a recessed area 145 corresponding to each key. The recessed area 145 serves to house the keys when the slider type portable mobile communications device 100 is in the closed position. This allows the slider type portable mobile communications device 100 to maintain a slimmer form factor since the height of the keys can be subtracted from the overall depth of the slider type portable mobile communications device 100 by virtue of the keys being compressed into the recessed areas 145 while in the closed position. This is more clearly illustrated in FIG. 3.

Figure 4:
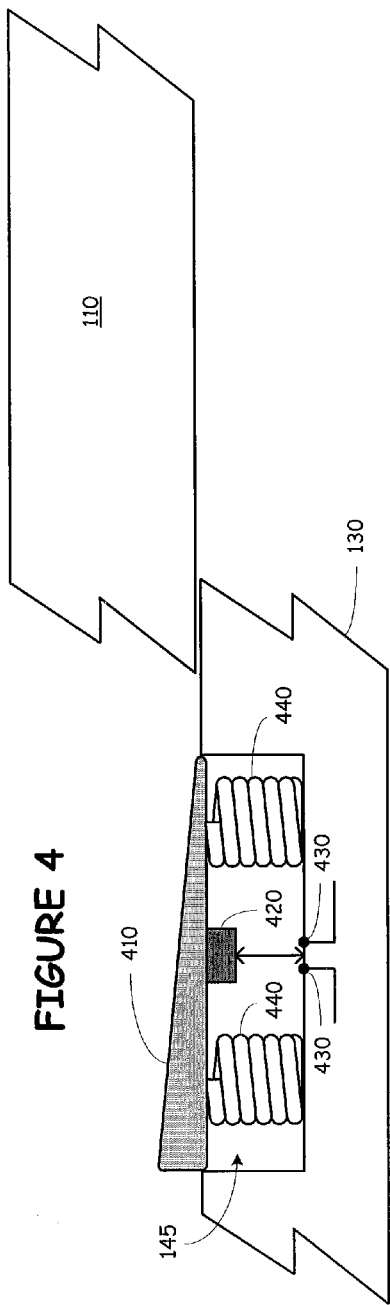
FIG. 4 is a side view illustration of one embodiment of a key on a slider type portable mobile communications device that is in the open position.
Figure 5:
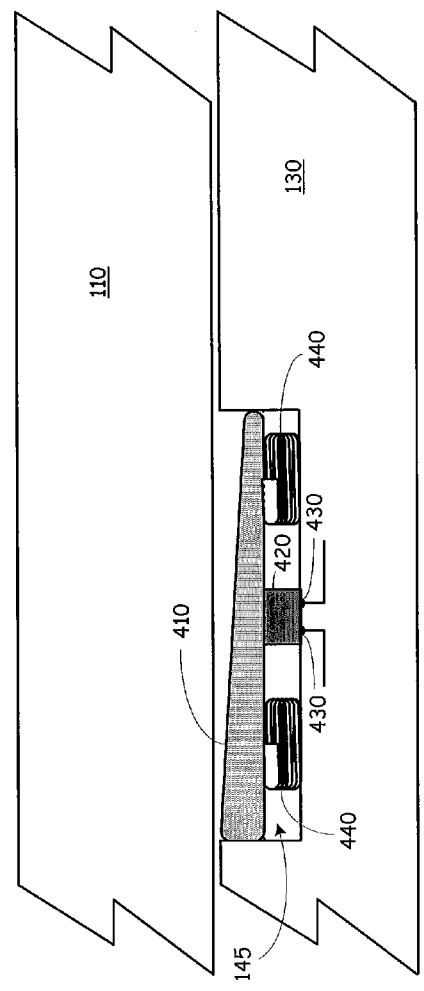
FIG. 5 is a side view illustration of one embodiment of a key on a slider type portable mobile communications device that is in the closed position.

The sliding action of the slider type portable mobile communications device 100 is used to compress and hold the keys of the keypad 140 securely within the recessed areas 145. FIGS. 4 and 5 illustrate more detail on the operation of the slider mechanism and its effect on the individual keys in the open and closed position for one embodiment of the invention.

FIG. 4 is a side view illustration of one embodiment of a key on a slider type portable mobile communications device 100 that is in the open position. The top panel 110 and to the bottom panel 130 in this cross-sectional view indicate that the slider type portable mobile communications device 100 is in the open position. The individual key 410 appears raised above the surface of the bottom panel 130. It is generally supported by one or more compressable mechanisms 440 such as, for instance, a spring mechanism, that affix the key 410 with the bottom panel 130. A metal (or otherwise conductive) contact 420 protrudes from the bottom of key 410. Contact 420 is positioned to come into physical contact with a pair of surface contacts 430 that are exposed on the bottom of the recessed area 145 when a sufficient downward force is applied to key 410. A sufficient downward force is typically exerted by the user when he presses the key 410. When contact 420 engages or touches surface contacts 430, a circuit corresponding to that key 410 is completed and a signal is indicative of a key press is carried to a processor within slider type portable mobile communications device 100 for appropriate processing.

FIG. 5 is a side view illustration of one embodiment of a key on a slider type portable mobile communications device 100 that is in the closed position. This figure illustrates that the overall depth form factor of the slider type portable mobile communications device 100 is unchanged by the height of the keys 410 of the keypad 140. To achieve this result, a wedge shaped or tapered key 410 is employed. As the top panel 110 is retracted from the open to the closed position with respect to the bottom panel 130, the leading edge of the top panel will ultimately come into contact with the first row of keys on the keypad 140. Since the key has been tapered to be substantially flush or even with the surface of the bottom panel at its leading edge, the top panel 110 can effectively slide over the key. As it encounters more resistance from the key due to the tapering, the weight of and force applied to the top panel can compress spring mechanism 440 to hold the key within the recessed area 145 while the top panel 110 sits atop the bottom panel 130 in the closed position.

Depending on the depth of the recessed area, the closed position may force contact 420 into contact with surface contacts 430. This would normally indicate a completed circuit that would cause a signal to be sent to the processor. However, the sensor mechanism 150 determines that the slider type portable mobile communications device 100 is in the closed position and deactivates the entire keypad such that no signals are sent from any of the keys to the processor regardless of whether the contact 420 and surface contacts 430 are touching one another.

In another embodiment, the recessed area can be made slightly deeper than the height of the keys 410 plus the height of the contact 420. In this arrangement, the top panel 110 will still hold the keys down in the closed position but the contact 420 will not have descended enough to contact the surface contacts 430. In this example, it is not necessary to globally deactivate the entire keypad while the slider type portable mobile communications device 100 is in the closed position. Thus, it also becomes unnecessary to distinguish between the open and closed position.

Figure 6:
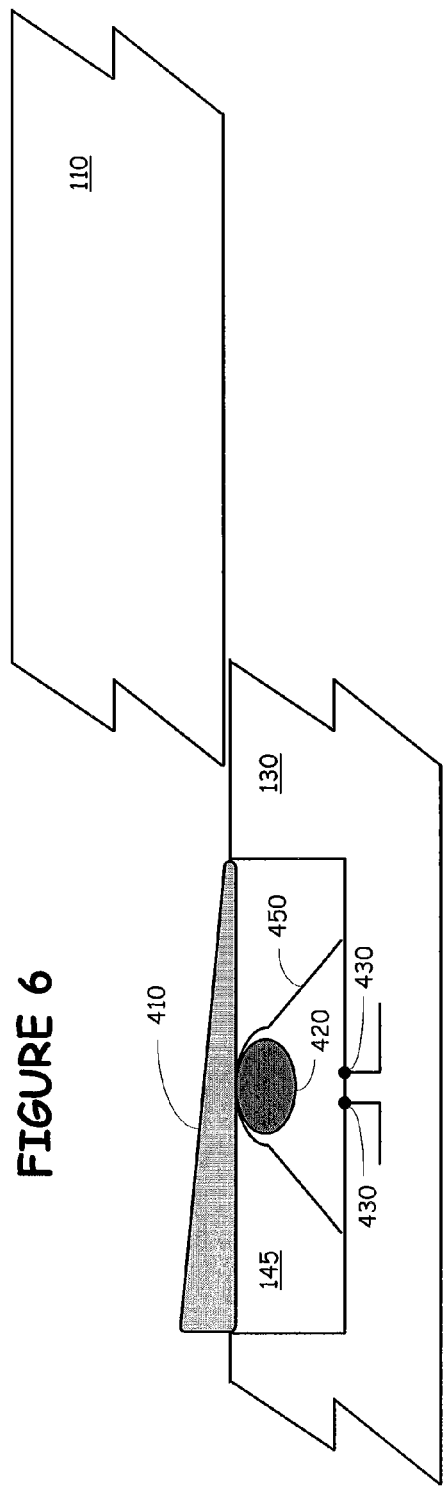
FIG. 6 is a side view illustration of another embodiment of a key on a slider type portable mobile communications device that is in the open position.
Figure 7:
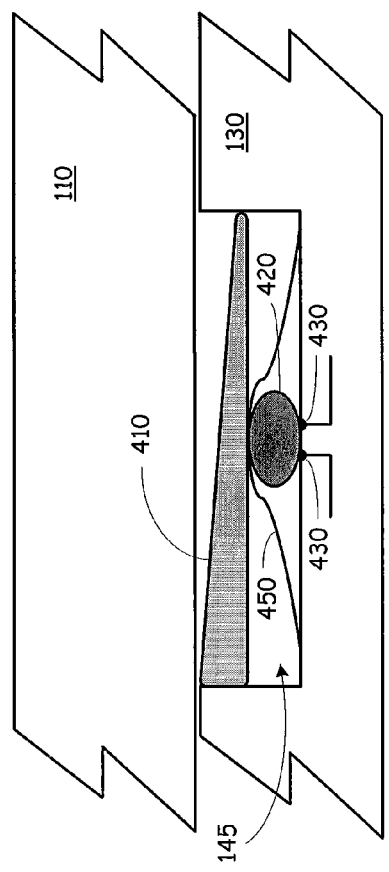
FIG. 7 is a side view illustration of another embodiment of a key on a slider type portable mobile communications device that is in the closed position.

FIGS. 6 and 7 illustrate more detail on the operation of the slider mechanism and its effect on the individual keys in the open and closed position for another embodiment of the invention.

FIG. 6 is a side view illustration of another embodiment of a key on a slider type portable mobile communications device 100 that is in the open position. The top panel 110 and the bottom panel 130 in this cross-sectional view indicate that the slider type portable mobile communications device 100 is in the open position. The individual key 410 appears raised above the surface of the bottom panel 130. It is generally supported by a compressable mechanism 440 such as, for instance, a mechanical tensioning mechanism, that affixes the key 410 with the bottom panel 130. The mechanical tensioning mechanism 450 is designed to remain rigid while under no pressure at a height that is equal to the depth of the recessed area 145. When a downward force is exerted on key 410, the mechanical tensioning mechanism 450 will collapse by allowing its base to expand outward. Upon release of the key, the tension in mechanical tensioning mechanism 450 will restore the key to its original position. A metal (or otherwise conductive) contact 420 protrudes from the bottom of key 410. The contact 420 is positioned to come into physical contact with a pair of surface contacts 430 that are exposed on the bottom of the recessed area 145 when a sufficient downward force is applied to key 410. A sufficient downward force is typically exerted by the user when he presses the key 410. When contact 420 engages or touches surface contacts 430, a circuit corresponding to that key 410 is completed and a signal is indicative of a key press is carried to a processor within slider type portable mobile communications device 100 for appropriate processing.

FIG. 7 is a side view illustration of another embodiment of a key on a slider type portable mobile communications device 100 that is in the closed position. This figure illustrates that the overall depth form factor of the slider type portable mobile communications device 100 is unchanged by the height of the keys 410 of the keypad 140. To achieve this result, a wedge shaped or tapered key 410 is employed. As the top panel 110 is retracted from the open to the closed position with respect to the bottom panel 130, the leading edge of the top panel will ultimately come into contact with the first row of keys on the keypad 140. Since the key has been tapered to be substantially flush or even with the surface of the bottom panel at its leading edge, the top panel 110 can effectively slide over the key. As it encounters more resistance from the key due to the tapering, the weight of and force applied to the top panel can compress or collapse the mechanical tensioning mechanism 450 to hold the key within the recessed area 145 while the top panel 110 sits atop the bottom panel 130 in the closed position.

Depending on the depth of the recessed area, the closed position may force contact 420 into contact with surface contacts 430. This would normally indicate a completed circuit that would cause a signal to be sent to the processor. However, the sensor mechanism 150 determines that the slider type portable mobile communications device 100 is in the closed position and deactivates the entire keypad such that no signals are sent from any of the keys to the processor regardless of whether the contact 420 and surface contacts 430 are touching one another.

In another embodiment, the recessed area can be made slightly deeper than the height of the keys 410 plus the height of the contact 420. In this arrangement, the top panel 110 will still hold the keys down in the closed position but the contact 420 will not have descended enough to contact the surface contacts 430. In this example, it is not necessary to globally deactivate the entire keypad while the slider type portable mobile communications device 100 is in the closed position. Thus, it also becomes unnecessary to distinguish between the open and closed position.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A slider type portable mobile communications device comprising:
   a top panel; and
   a bottom panel, where the top panel and the bottom panel are slidably movable to define a closed position and an open position, where the bottom panel includes:
      one or more keys, the one or more keys being tapered from front to back, where, for each of the one or more keys, a back edge is raised above a surface of the bottom panel and a front edge is substantially even with the surface of the bottom panel,
      one or more recessed areas associated with the one or more keys, each of the one or more recessed areas containing an associated one of the one or more keys, each of the one or more recessed areas further including a pair of electrical surface contacts on a bottom surface of the recessed area, and
      for each of the one or more recessed areas, a compressible mechanism that attaches an associated one of the one or more keys to the bottom surface of the one of the one or more recessed areas,
   where the closed position includes the top panel substantially covering the bottom panel,
   where the open position includes the bottom panel being offset from the top panel such that a portion of the bottom panel is exposed,
   where, when the top panel moves from the open position to the closed position, the top panel encounters the one or more keys and exerts a downward force on the one or more keys, the downward force to compress and hold the one or more keys in the respective one or more recessed areas to maintain a consistent depth form factor for the slider type portable mobile communications device, and
   where the compressible mechanism for each of the one or more recessed areas includes:
      a mechanical tensioning mechanism that collapses to expand outward downward force is exerted and returns to an original form when the downward force is removed, and
      a conductive portion that, when the mechanical tensioning mechanism collapses, completes a circuit between the pair of electrical surface contacts.

2. The slider type portable mobile communications device of claim 1, where the compressible mechanism includes one or more spring mechanisms.

3. The slider type portable mobile communications device of claim 1, where the one or more keys, when compressed, move substantially perpendicular to a plane defined by movement of the top panel relative to the bottom panel.

* * * * *